United States Patent
Yano et al.

(10) Patent No.: US 8,322,594 B2
(45) Date of Patent: Dec. 4, 2012

(54) ELECTRODE PLATE WRAPPING DEVICE AND METHOD OF WRAPPING ELECTRODE PLATE WITH SEPARATORS

(75) Inventors: Yasuhiro Yano, Hirakata (JP); Manabu Yamashita, Kyoto (JP); Hiroshi Yuhara, Yokohama (JP); Takahiro Yanagi, Kawasaki (JP); Yasufumi Okazaki, Yamato (JP)

(73) Assignees: Kyoto Seisakusho Co., Ltd., Kyoto (JP); Nissan Motor Co., Ltd., Kanagawa (JP)

( * ) Notice: Subject to any disclaimer, the term of this patent is extended or adjusted under 35 U.S.C. 154(b) by 0 days.

(21) Appl. No.: 13/424,401

(22) Filed: Mar. 20, 2012

(65) Prior Publication Data

US 2012/0175406 A1 Jul. 12, 2012

Related U.S. Application Data

(62) Division of application No. 13/030,169, filed on Feb. 18, 2011.

(30) Foreign Application Priority Data

Nov. 25, 2010 (JP) .................................. 2010-262748

(51) Int. Cl.
   *B23K 31/02* (2006.01)
   *H01M 4/82* (2006.01)
(52) U.S. Cl. ........ 228/170; 228/212; 228/102; 29/623.1
(58) Field of Classification Search ................... 228/170, 228/212, 102; 29/623.1
See application file for complete search history.

(56) References Cited

U.S. PATENT DOCUMENTS

| 4,080,732 A | 3/1978 | Eberle |
| 2009/0208832 A1 | 8/2009 | Beard |

FOREIGN PATENT DOCUMENTS

| GB | 2 001 797 A | 2/1979 |
| JP | 2009009919 A * | 1/2009 |
| WO | 92/02055 A1 | 2/1992 |

OTHER PUBLICATIONS

Machine Translation of JP 2009009919 A, originally published 2009.*
Yano et al.; "Electrode Plate Wrapping Device and Method of Wrapping Electrode Plate with Separators"; U.S. Appl. No. 13/030,169, filed Feb. 18, 2011.
Official Communication issued in corresponding European Patent Application No. 11154763.4, mailed on Aug. 27, 2012.

* cited by examiner

*Primary Examiner* — Nicholas D'Aniello
(74) *Attorney, Agent, or Firm* — Keating & Bennett, LLP (57) ABSTRACT

In some examples, an electrode plate K is conveyed to a gap 230 of a pair of stacking drums 210 and 220 with a conveying section 100. In synchronization with conveyance of the electrode plate K, the drums 210 and 220 feed a pair of separators S each formed into a predetermined shape with the separators S adhering to corresponding peripheral surfaces of the pair of drums 210 and 220. While feeding the electrode plate K forward in a generally horizontal manner, the separators S are sequentially stacked on both surfaces of the electrode plate K in synchronized with rotations of the drums 210 and 220, and both edge portions of the separators S are welded.

4 Claims, 11 Drawing Sheets

ELECTRODE PLATE WRAPPING DEVICE AND METHOD OF WRAPPING ELECTRODE PLATE WITH SEPARATORS

BACKGROUND OF THE INVENTION

1. Field of the Invention

The preferred embodiments of the present invention relate, inter alia, to an electrode plate wrapping device for wrapping a positive electrode plate or a negative electrode plate with separators, and a method of wrapping an electrode plate with separators.

2. Description of the Related Art

The following description sets forth the inventor's knowledge of related art and problems therein and should not be construed as an admission of knowledge in the prior art.

In recent years, so-called stack type batteries have become widely used as various types of batteries, such as, e.g., batteries for automobiles, solar batteries, or batteries for electronics devices. Such a stack type battery is constituted by stacking a positive electrode plate, a separator, a negative electrode plate, and a separator alternately in this order.

For stacking a positive electrode plate, a separator, and a negative electrode plate, various stacking devices have been proposed. Among other things, a stacking device proposed by Japanese Unexamined Laid-open Patent Application Publication No. H04-101366 (JP-A-H04-101366) is known. In this proposal, for example, negative electrode plates are conveyed by a first conveyer in an arranged manner, and positive electrode plates wrapped with separators are also conveyed with a second conveyer in an arranged manner. A swingable device stacks the negative electrode plate and the positive electrode plate wrapped with separators one on the other alternately on a third conveyer. In other words, in this proposal, one of the positive electrode plate and the negative electrode plate is wrapped with separators, and then the wrapped electrode plate and the electrode plate of a reverse polarity are stacked alternately.

In this case, since the electrode plates each wrapped with separators are required to be conveyed consecutively, the electrode plates are each required to be wrapped with separators consecutively. Such electrode plate wrapping devices are disclosed by, for example, Japanese Unexamined Laid-open Patent Application Publication No. S56-102064 (hereinafter referred to as "JP-A-S56-102064"), Japanese Unexamined Laid-open Patent Application Publication No. H10-106588 (hereinafter referred to as "JP-A-H10-106588"), Japanese Unexamined Laid-open Patent Application Publication No. H10-275628 (hereinafter referred to as "JP-A-H10-275628"), and Japanese Unexamined Laid-open Patent Application Publication No. 2009-9919 (hereinafter referred to as "JP-A-2009-9919").

JP-A-S56-102064 and JP-A-H10-106588 disclose a device configured to weld both side edge portions of a two-folded separator in which a continuous electrode plate is arranged. JP-A-H10-275628 discloses a device configured to convey a continuous belt-like electrode plate in a generally horizontal manner while supplying a pair of separators onto both surfaces of the electrode plate to make the separators adhere to the surfaces of the electrode plate with a pair of rollers and then dry the electrode plate wrapped with separators. Further, JP-A-2009-9919 discloses a device configured to wrap a positive electrode plate or a negative electrode plate, each formed into a predetermined shape, with a pair of continuous separators.

In each proposal, however, a pair of continuous separators are adhered to both surfaces of an electrode plate and welded and then cut into a predetermined shape of a battery cell. This causes a problem that it takes a time to produce each electrode plate wrapped with separators, which in turn poses a problem in stacking electrodes at the later step. Thus, as a whole, the production efficiency of a battery cell was not good.

The description herein of advantages and disadvantages of various features, embodiments, methods, and apparatus disclosed in other publications is in no way intended to limit the present invention. Indeed, certain features of the invention may be capable of overcoming certain disadvantages, while still retaining some or all of the features, embodiments, methods, and apparatus disclosed therein.

SUMMARY OF THE INVENTION

The preferred embodiments of the present invention have been developed in view of the above-mentioned and/or other problems in the related art. The preferred embodiments of the present invention can significantly improve upon existing methods and/or apparatuses.

Among other potential advantages, some embodiments can provide an electrode plate wrapping device capable of quickly produce an electrode plate wrapped with separators in a continuous manner.

Among other potential advantages, some embodiments can provide an electrode plate wrapping method capable of improving the production efficiency of an electrode plate wrapped with separators.

According to a first aspect of a preferred embodiment of the present invention, an electrode plate wrapping device for wrapping a positive or negative electrode plate with separator includes a conveying section configured to convey the electrode plate, a stacking drum section including a pair of drums arranged in parallel so as to face with each other and configured to feed a pair of separators with the pair of separators adhering to corresponding peripheral surfaces of the pair of drums, and a welding section configured to weld edge portions of the pair of separators in a state in which the electrode plate is sandwiched by and between the pair of separators. The conveying section conveys the electrode plate to the pair of drums, and the pair of drums feed the pair of separators in synchronization with conveyance of the electrode plate with the pair of separators adhering to the corresponding peripheral surfaces of the pair of drums. During a step of conveying the electrode plate by and between the pair of drums in synchronization with rotations of the pair of drums, the pair of separators are stacked on corresponding surfaces of the electrode plate and the edge portions of the pair of separators are welded by the welding section.

According to this device, since the separators each formed into a predetermined shape are stacked on both surfaces of the electrode plate utilizing rotations of the drums of the drum section, an electrode plate wrapped with separators can be produced quickly in a continuous manner.

In the aforementioned electrode plate wrapping device, it is preferable that the device further includes a pair of separator cutters provided in a vicinity of corresponding peripheral surfaces of the pair of drums, wherein the pair of separator cutters are each configured to cut a single continuous separator into a predetermined shape in a state in which the separator is adhered to the peripheral surface of the drum. With this device, since the separator is cut into a predetermined shape in a state in which the separator is adhered to the peripheral surface of the drum, an electrode plate wrapped with separators can be produced more quickly in a continuous manner.

In the aforementioned electrode plate wrapping device, it is preferable that the device further includes a feed roller unit arranged in a vicinity of one of the pair of drums to feed the separator on the peripheral surface of the one of the pair of drums. With this device, the operation of fitting the separator onto the drum can be easily controlled.

Furthermore, it is preferable that the feed roller unit is controlled so that feeding of the separator is synchronized with conveyance of the electrode plate by stopping feeding of the separator to cause slipping of the separator on the peripheral surface of the one of the pair of drums. With this structure, by controlling the operation of fitting the separator onto the drum, the conveying of the electrode plate and the feeding of the separator can be synchronized.

Furthermore, it is preferable that each of the pair of drums has air suction holes on the peripheral surface thereof so that the separator is adhered to the peripheral surface by sucking air through the air suction holes. With this, the separator can be easily and assuredly adhered to the peripheral surface of the drum.

Furthermore, it is preferable that the conveying section includes a conveyer for conveying the electrode plate with the electrode plate placed thereon and a suction device for conveying the electrode plate to the pair of drums while sucking an upper surface the electrode plate. With this structure, the electrode plate can be easily and assuredly conveyed to the gap of the pair of drums. Furthermore, by controlling the posture and/or position of the electrode plate by the suction device, even in cases where displacements of the electrode plate occur on the conveyer, the electrode plate can be fed to the gap of the drum section in an appropriate posture and position.

Furthermore, it is preferable that the conveying section further includes an electrode plate detector arranged to detect the electrode plate which is being conveyed by the conveyer. With this, the position and/or posture of the electrode plate can be recognized. The electrode plate detector can be a sensor camera configured to take a photograph of the electrode which is being conveyed by the conveyer.

Furthermore, it is preferable that the welding section is of a structure that pinches the pair of separators, and is controlled so that the welding section grips tip end portions of the pair of separators upon initiation of stacking the pair of separators on corresponding surfaces of the electrode plate, pulls out the pair of separators in synchronized with rotations of the drums while gripping the tip end portions of the pair of separators, and then welds the edge portions of the pair of separators by pinching the edge portions. With this structure, even if the separator passes through the gap of the drum section with the separator charged with electric static charges, the separator is prevented from being adhered to the peripheral surface of the drum. Furthermore, since the welding section normally required at the post-process is used, additional device is not required. Performing welding while gripping the tip end portions enables provisional welding of the tip end portion.

Furthermore, it is preferable that the welding section is configured to perform spot welding of the edge portions of the separators. In this case, the edge portions of the separators can be easily and assuredly provisionally welded.

Furthermore, it can be configured such that the welding section is of a heat-roller structure having a pair of heat-rollers that rotate while pinching the pair of separators therebetween, and is configured to weld lateral side edge portions of the pair of separators consecutively by pinching the lateral side edge portions while rotating in synchronization with rotations of the drums. With this, the stacking of separators on both surfaces of the electrode plate and the welding of the side edge portions of the separators can be performed simultaneously.

A battery cell can be produced by alternately stacking the positive or negative electrode plate wrapped with separators produced with one of the aforementioned device, a counter negative or positive electrode plate or counter negative or positive electrode plate wrapped with separators. With this, a battery cell can be produced efficiently by alternately stacking them.

According to a second aspect of a preferred embodiment of the present invention, a method of wrapping an electrode plate with separators, the method includes the steps of: arranging a pair of drums in parallel so as to face with each other; conveying an electrode plate to the pair of drums while feeding a pair of separators in synchronization with conveyance of the electrode plate in a state in which the pair of separators are adhered to corresponding peripheral surfaces of the pair of drums; and while conveying the electrode plate by and between the pair of drums in synchronization with rotations of the pair of drums, stacking the pair of separators on corresponding surfaces of the electrode plate and welding edge portions of the separators.

With this method, since the separators each formed into a predetermined shape are stacked on both surfaces of the electrode plate utilizing rotation of the drum section, an electrode plate wrapped with separators can be produced quickly in a continuous manner. Therefore, in producing a battery cell at the post-process, it becomes possible to continuously supply the electrode plate wrapped with separators sequentially, resulting in improved production efficiency of battery cells.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention are shown by way of example, and not limitation, in the accompanying figures, in which:

FIGS. 2A and 2B are schematic cross-sectional views showing a process of welding separators, wherein

DETAILED DESCRIPTION OF THE PREFERRED EMBODIMENTS

In the following paragraphs, some preferred embodiments of the invention will be described by way of example and not limitation with reference to the attached drawings. It should be understood based on this disclosure that various other modifications can be made by those in the art based on these illustrated embodiments.

An electrode plate wrapping device according to preferred embodiments of the present invention will be explained with reference to the attached drawings.

First Embodiment

Figure 1:
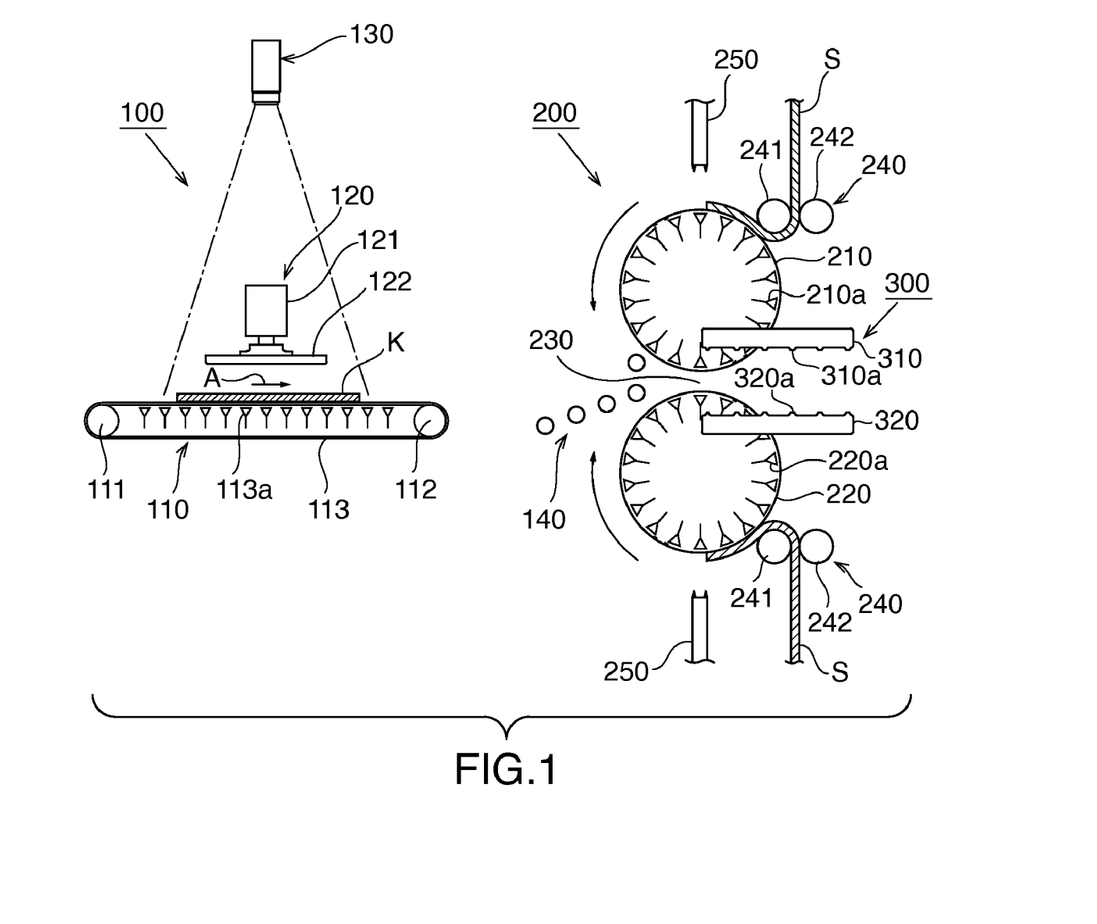
FIG. 1 is a schematic structural view showing an electrode plate wrapping device according to a first embodiment of the present invention.

FIGS. 1 to 9 show a first embodiment of the present invention. As shown in FIG. 1, the electrode plate wrapping device includes a conveying section 100 for conveying an electrode plate K of a predetermined shape, a stacking drum section 200 arranged at a downstream side of the conveying section 100 in a conveying direction (i.e., in the direction of the arrow A in FIG. 1), and a welding section 300 arranged at both lateral sides of the stacking drum section 200 with respect to the conveying direction.

The conveying section 100 includes a conveyer 110 for conveying electrode plates K thereon in a generally horizontal manner. This conveyer 110 has first and second rotational conveyer rollers 111 and 112 arranged at front and rear ends of the conveying direction and a suction belt 113 put around both the first and second rotational conveyer rollers 111 and 112 in an endless manner. The clockwise rotational movements of the first and second conveyer rollers 111 and 112 cause a forward movement (i.e., rightward movement in FIG. 1) of the upper side portion of the suction belt 113, resulting in a forward movement of the electrode plate K disposed on the conveyer 110. Thus, a plurality of electrode plates K can be conveyed consecutively with this conveying section 100 by, for example, placing the plurality of electrode plates K on the suction belt 113 at certain intervals. In this embodiment, the conveyer 100 is employed as a means for conveying the electrode plate K in a generally horizontal manner, but not limited it. It should be noted that the present invention allows the use of various types of conveying devices other than belt conveyers mentioned above.

The suction belt 113 has a number of air suction holes 113a so that the electrode plate K can be fixed thereon at a predetermined position by sucking air through the air suction holes 113a.

Figure 3A:
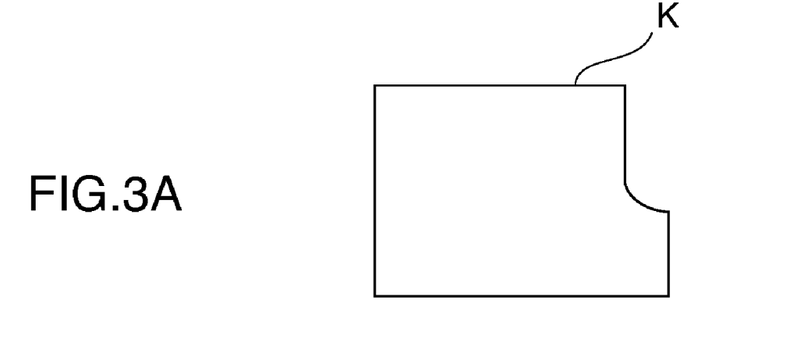
FIG. 3A is a plan view showing an electrode plate.

The electrode plate K is formed into a predetermined shape, for example, as shown in FIG. 3A before being conveyed by the conveyer 110. The electrode plate K previously cut into a predetermined shape can be placed on the conveyer 110. Alternatively, a single continuous electrode plate K can be placed on the conveyer 110 and then cut into a predetermined shape on the conveyer 110. The electrode plate K is not specifically limited, and can be any known electrode plate. For example, a positive electrode plate can be a plate formed by applying a solution liquid of Lithium cobalt oxide onto both surfaces of an aluminum substrate such as an aluminum plate or foil, and a negative electrode plate can be a plate formed by applying a solution liquid of carbon material onto both surfaces of a copper substrate such as a copper plate or foil.

The conveying section 100 includes a suction device 120 arranged above the conveyer 110. This suction device 120 is comprised of a main body 121 connected to and driven by a driving device (not illustrated) and a suction head 122 attached to the lower portion of the main body 121, and is configured so that the suction device 120 cab be moved up and down and right and left in accordance with the operation of the driving device.

When the electrode plate K is conveyed to a predetermined position by the conveyer 110, the suction device 120 goes down to suck the electrode plate K with the suction head 122 and then goes up while sucking the electrode plate K with the suction head 122 with the electrode plate K kept in a generally horizontal posture. Thereafter, the suction device 120 moves toward the stacking drum section 200 (i.e., moves rightward in FIG. 1) to thereby convey the electrode plate K from the conveyer 110 to the gap 230 between a pair of drums 210 and 220 of the drum section 200.

The electrode plate K conveyed with the conveyer 110 is sometimes displaced laterally and/or obliquely with respect to the conveying direction A. The suction device 120 is designed to move while correcting the lateral and/or oblique displacement of the electrode plate K into an appropriate posture during the conveyance of the electrode plate K. Thus, the electrode plate K can be conveyed to the gap 230 between the adjacent drums 210 and 220 of the drum section 200 in an appropriate posture.

The conveying section 100 also includes a sensor camera (i.e., electrode plate detector) 130 arranged above the suction device 120. This sensor camera 130 takes a photograph of the electrode plate K which is being conveyed on the conveyer 130. More specifically, the sensor camera 130 takes a photograph of the electrode plate K when the electrode plate K is conveyed to a predetermined position to recognize the position and/or posture of the electrode plate K from the photographed image, and then sends a prescribed signal to a controller 50. The controller 50 which received the signal controls the driving device (not illustrated), so that the suction device 120 goes down to the electrode plate K and then carries the electrode plate K to the gap 230 of the drum section 200 while correcting the lateral and/or oblique displacement of the electrode plate K into an appropriate posture during the conveying step of the electrode plate K.

In this embodiment, the position and/or posture of the electrode plate K is recognized using the sensor camera 130. In place of using the camera, however, another simple sensor (s) can be used to recognize the position and/or posture of the electrode plate K by detecting, for example, the tip end portion of the electrode plate K.

The conveying section 100 further includes a support portion 140 in the front vicinity of the drum section 200. This support portion 140 is comprised of a plurality of rollers and configured to support the electrode plate K conveyed by the suction device 120 and feed the electrode plate K to the gap 230 of the drum section 200.

Figure 7A:
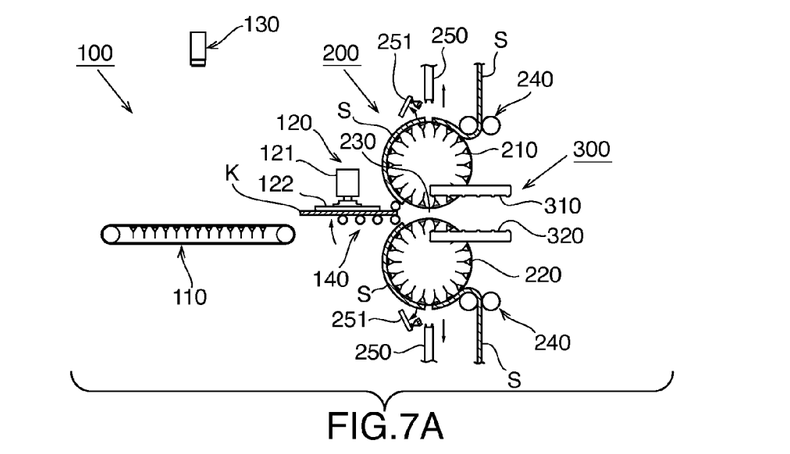
FIGS. 7A to 7C show a third step of the electrode plate wrapping method.
Figure 7B:
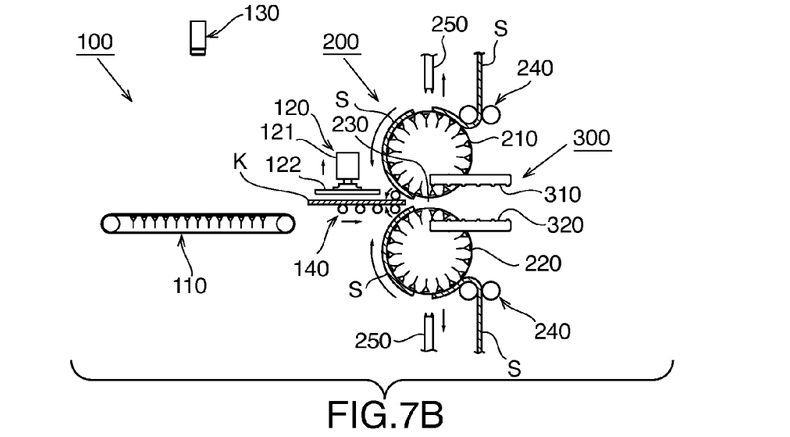
Figure 7C:
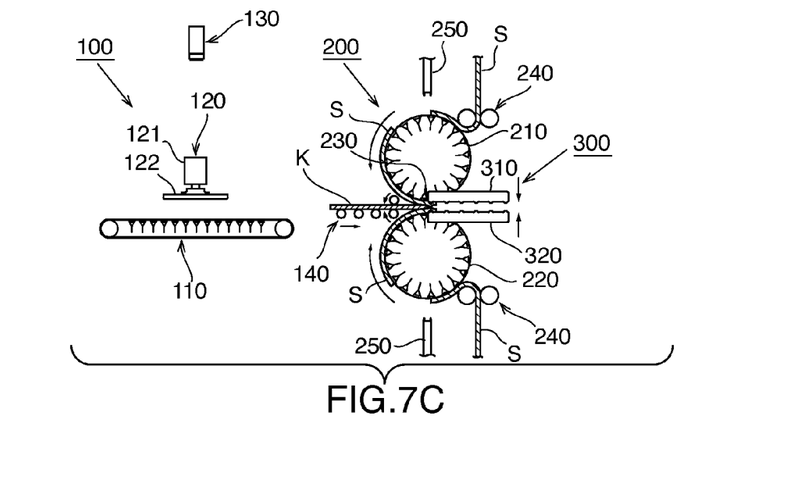

The support portion 140 normally keeps a posture inclined obliquely forward as shown in FIG. 1, but takes a generally horizontal posture when receiving the electrode plate K from the suction device 120 as shown in FIG. 7A. The support portion 140 is provided with a pair of upper and lower rollers facing in the up-and-down direction at the most downstream end, so that the rollers can pinch the electrode plate K from both surfaces thereof.

In detail, when the electrode plate K is conveyed with the suction device 120, the pair of rollers of the support portion 140 located at the most downstream end pinches the tip end portion of the electrode plate K from both surfaces thereof, and then the remaining rolls are raised to take a generally horizontal posture to thereby support the electrode plate K thereon. After being supported by the support portion 140, the electrode plate K is released from the suction head 122 of the suction device 120 and fed into the gap 230 of the drum section 200 in accordance with the rotations of the rollers constituting the support portion 140.

Figure 2A:
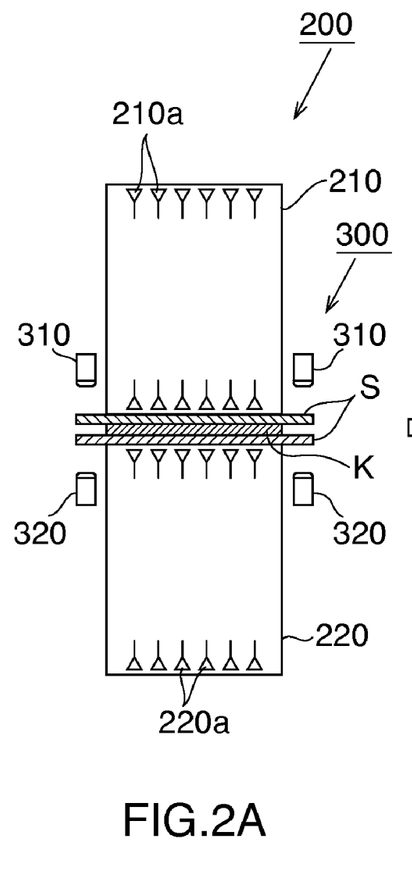
FIG. 2A shows a cross-sectional view in a state in which the separators are not welded.
Figure 2B:
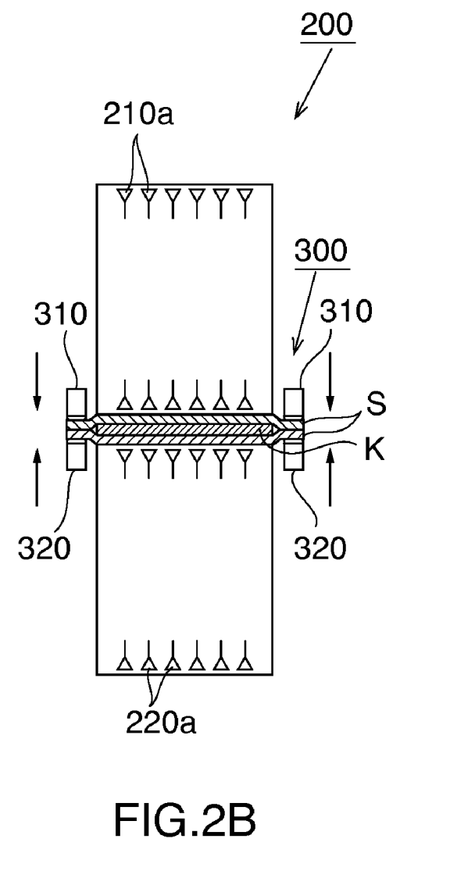
FIG. 2B shows a cross-sectional view in a state in which the separators are being welded.

The stacking drum section 200 is comprised of a pair of upper and lower cylindrical drums 210 and 220. The upper and lower cylindrical drums 210 and 220 are arranged in parallel with each other with a predetermined gap 230 formed therebetween such that the axis of each drum extends in a direction perpendicular to the conveying direction A. Each of the drums 210 and 220 is formed to have an axial length (i.e., width) longer than a width of the separator S so that both side edge portions of the separator S protrude from both end portions of the drums 210 and 220 in state in which the electrode plate K is pinched by and between the drums 210 and 220 as shown in FIGS. 2A and 2B.

In this stacking drum section 200, the upper and lower drums 210 and 220 rotate such that the respective peripheral surfaces of the drums move in the same conveying direction between the gap 230. In detail, the upper drum 210 rotates counterclockwise in FIG. 1 to feed an upper separator S to the gap 230 with the separator S adhering to the peripheral surface of the drum 210. On the other hand, the lower drum 220 rotates clockwise in FIG. 1 to feed a lower separator S to the gap 230 with the separator S adhering to the peripheral surface thereof. The upper and lower drums 210 and 220 are driven by a driving motor (not illustrated) controlled by the controller 50.

The upper and lower drums 210 and 220 of the stacking drum section 200 each have a plurality of air suction holes 210a and 220a on the peripheral surface thereof so that a separator S can be immovably fixed on the peripheral surface of the drum by sucking air through the air suction holes 210a and 220a.

In the gap 230, the stacking drum section 200 sequentially stacks the separators S on both surfaces of the electrode plate K conveyed in a generally horizontal manner in synchronization with the rotation of the drum section 200 in accordance with the rotation of the drum section 200.

More specifically, the electrode plate K is conveyed toward the gap 230 of the stacking drum section 200, and the tip end portion of the electrode plate K reaches the gap 230. On the other hand, in synchronization with the conveying of the electrode plate K, the separators S and S are conveyed to the gap 230 of the stacking drum section 200 in accordance with the rotation of each drum. The tip end portions of the separators S and S reached the gap 230 of the drum section 200 are overlapped in the gap 230. Thereafter, the electrode plate K is conveyed forward with the support portion 140 in a generally horizontal posture in synchronization of the rotation of the drum section 200. During the conveying step, the separators S and S sucked on the peripheral surface of the drum section 200 are sequentially stacked on both surfaces of the electrode plate K. At this time, the welding section 300 grips both lateral side edges of the tip end portion of the separators S and S and pulls the separators S forward.

At the obliquely upper and lower downstream side portions of the drum section 200 as shown in FIG. 1, a pair of cylindrical small feed roller unit 240 is provided respectively. The pair of feed roller unit 240 are comprised of a pair of front and rear feed rollers 241 and 242 arranged in the conveying direction A with a certain distance therebetween. This feed roller unit 240 are configured to feed a single continuous separator S fed from a separator roller (not illustrated) to the drum section 200 at a predetermined timing while pinching the separator S therebetween upon receipt of the command of the controller 50. At this time, the feed roller unit 240 stops feeding the separator S to cause slipping of the separator S on the peripheral surface of the drum 210 or 220 so that the feeding of the separator S is synchronized with the feeding of the electrode plate K. The concrete feed timing of the separator S by the feed roller unit 240 will be explained later.

Figure 3B:
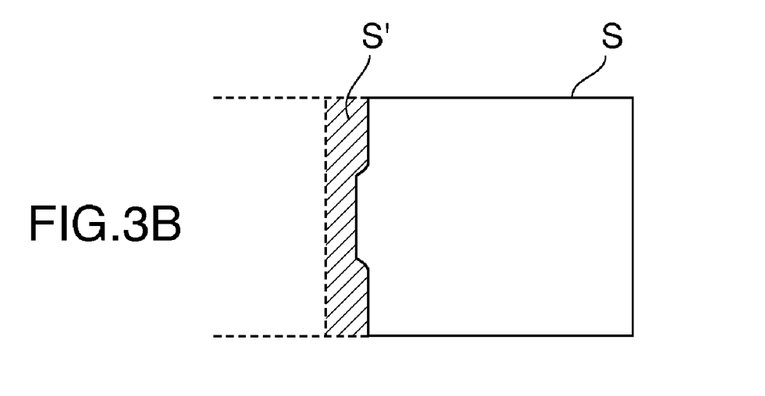
FIG. 3B is a plan view showing a separator.

An upper separator cutter 250 is provided above the drum section 200, and a lower separator cutter 250 is provided below the drum section 200. Each cutter 250 cuts the separator S fitted on the peripheral surface of the drum 210 or 220. In detail, when the separator S is fed to a predetermined position with the separator S adhering to the peripheral surface of the drum 210, each separator cutter 250 approaches the corresponding drum 210 or 220 upon receipt of the command of the controller 50 to cut the separator S into a predetermined shape, for example, as shown in FIG. 3B, with a cutter blade attached to the tip end of the cutter 250. The material of the separator S is not limited to a specific one, and a conventionally available separator can be used. For example, an insulating film made of polypropylene (PP) resin or polyethylene (PE) resin can be employed as a separator S.

As explained above, in this embodiment, a single continuous separator S is fixedly adhered to the peripheral surface of the drum 210 or 220 and then cut into a predetermined shape on the peripheral surface of the drum 210 or 220 during the feeding process. This eliminates a separate cutting process for cutting the separator S into a predetermined shape, resulting in quick feeding of the separator S. The cut portion S' of the separator S as shown in FIG. 3B is removed by a cutter suction head 251 shown in FIG. 7A to prevent the cut portion S' from being remained in the device.

The welding section 300 is configured to weld both side edge portions of the separators S stacked on both surfaces of the electrode plate K. The welding section 300 includes a right side pair of upper and lower welders 310 and 320 and a left side pair of upper and lower welders 310 and 320. Each pair of welders 310 and 320 are arranged so that the welders 310 and 320 are shifted toward the downstream side or in the conveying direction A (i.e., in the right direction in FIG. 1) with respect to the rotational center of the drum 210 (220).

Figure 3C:
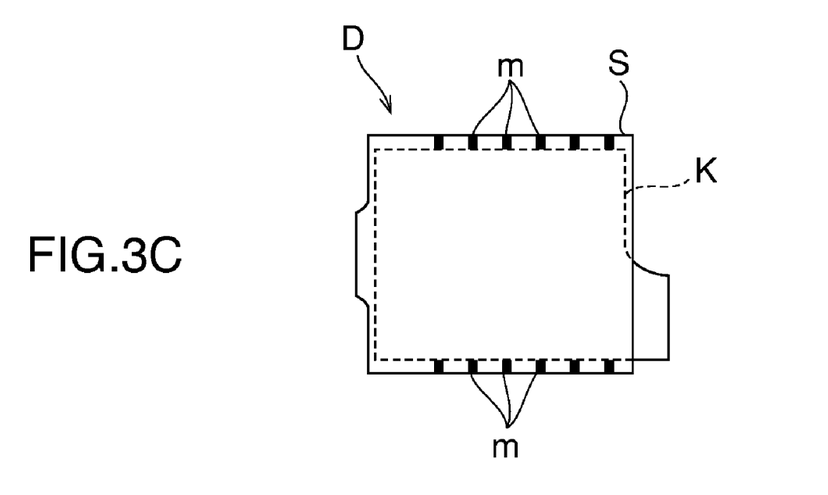
FIG. 3C is plan view showing a battery cell element.
Figure 4:
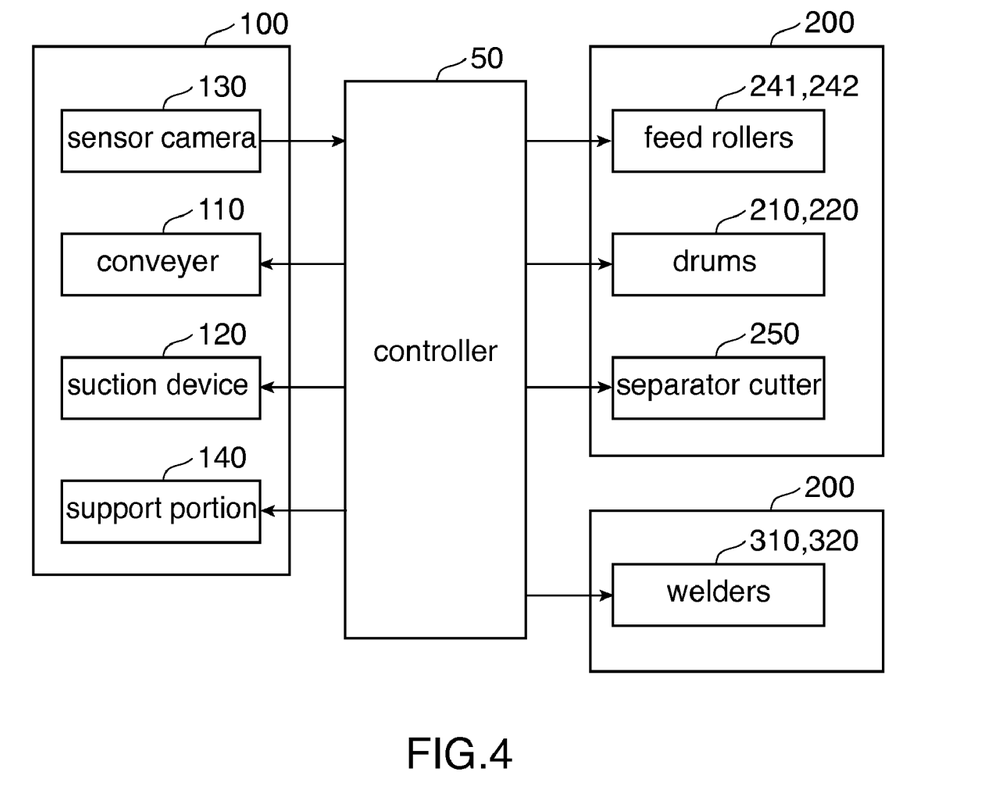
FIG. 4 is a block diagram of this device.
Figure 5A:
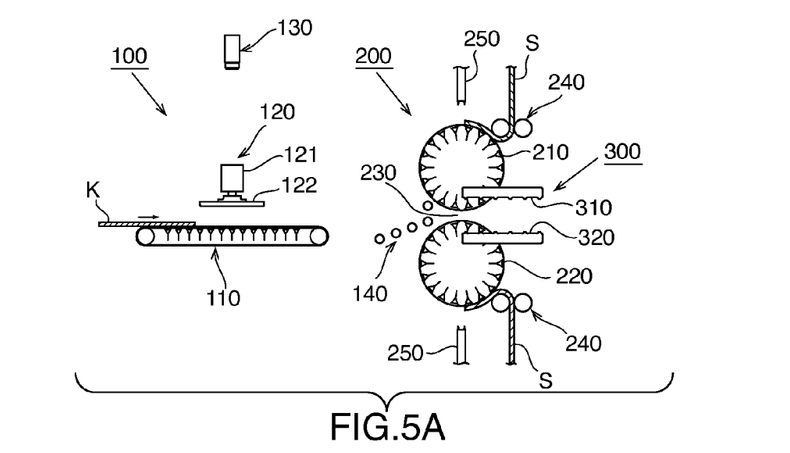
FIGS. 5A to 5C show a first step of an electrode plate wrapping method.
Figure 5B:
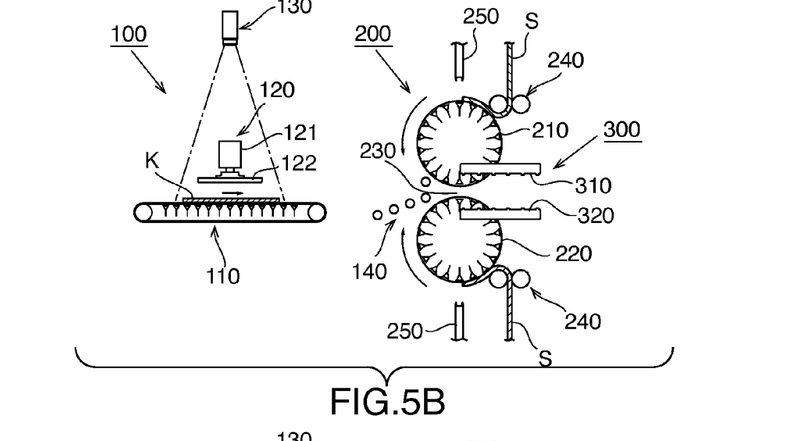
Figure 5C:
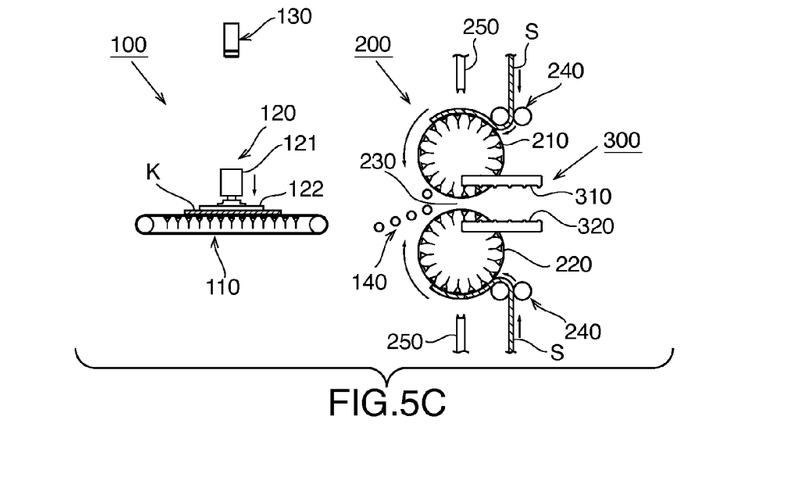
Figure 6A:
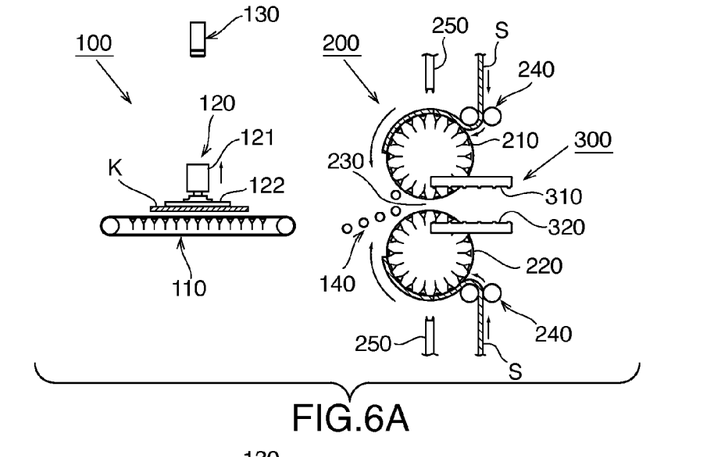
FIGS. 6A to 6C show a second step of the electrode plate wrapping method.
Figure 6B:
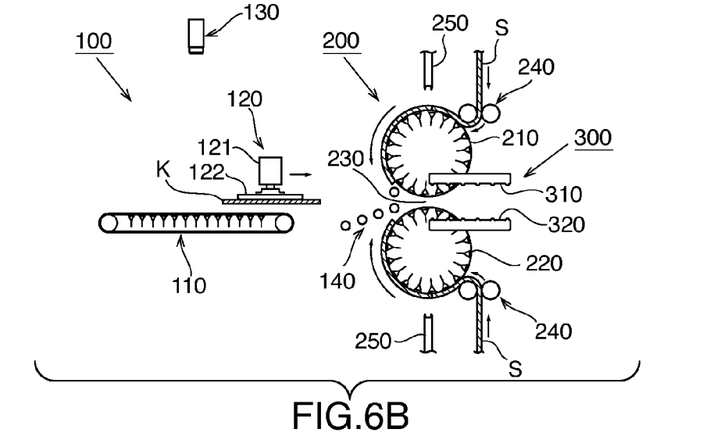
Figure 6C:
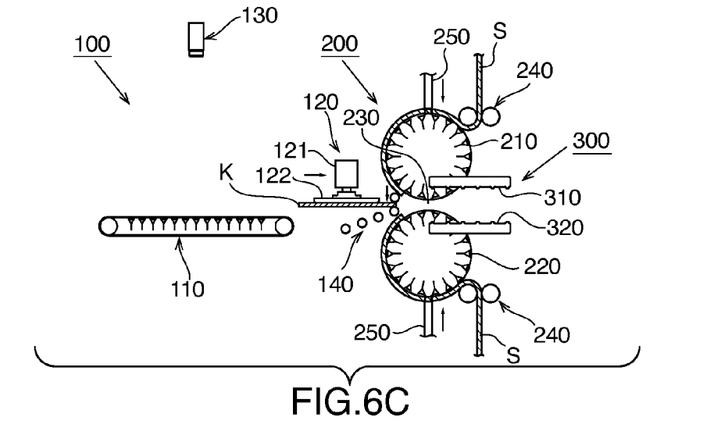

Each of the upper and lower welders 310 and 320 of the welding section 300 has a plurality of protrusions 310a and 320a on the corresponding opposed surface and arranged at certain intervals in the longitudinal direction of the welder 300, so that the upper and lower separators S and S are welded at the portions corresponding to the protrusions 310a and 320a. Thus, the welded separators S and S have a plurality of welded portions "m" arranged along the longitudinal direction of the separators at both side edge portions thereof as shown in FIG. 3C. By welding both side edge portions of the separators S and S at a plurality of welded portions "m," both the separators S and S become a provisionally welded state.

Each pair of the welders 310 and 320 are normally arranged with a distance therebetween in the up-and-down direction, and moved in the approaching direction to grip the tip end portions of both side edges of the separators S upon arrival of the tip end portion of the separators S. Then, the welding section 300 moves forward (i.e., toward the downstream side) in synchronization with the rotations of the drums 210 and 220 with the tip end portions of both side edges of the separators S gripped with the welding section 300. When the electrode plate K wrapped with the separators S (hereinafter referred to as "battery cell element D") reaches a predetermined position, the pair of upper and lower welders 310 and 320 move in the direction away from each other, then move backward (i.e., toward the upstream side) and move in the approaching direction to pinch both side edge portions of the separators S of the battery cell element D to thereby welding them at the welding points "m." Thereafter, after transferring the battery cell element D with both side edge portions of the separators S pinched to the predetermined position, the welders 310 and 320 move in the direction away from each other to release the battery cell element D.

Figure 10A:
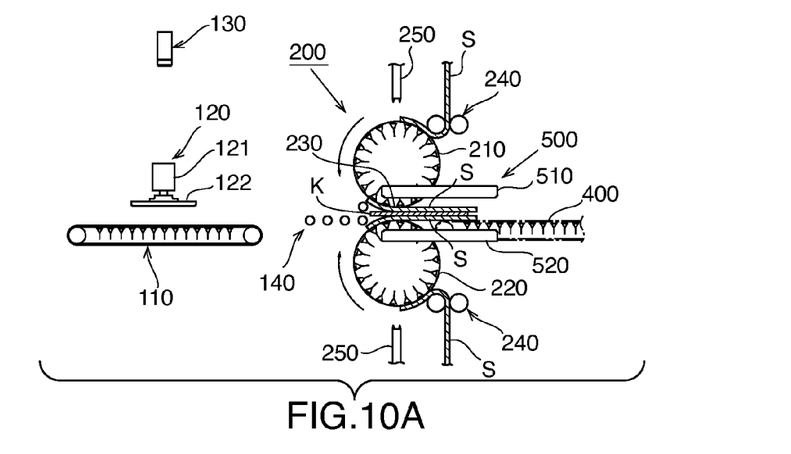
FIGS. 10A to 10C show an electrode plate wrapping method according to a second embodiment of the present invention.

As shown in FIG. 10, a second conveyer 400 is arranged in front of (i.e., at the downstream side) of the drum section 200. This second drum section 400 is configured to place the battery cell element D in which he electrode plate K is sandwiched by and between the separators S and convey the battery cell element D to a predetermined position after the battery cell element D is released from the welding section 300.

Now, a method of wrapping an electrode plate K with separators S using the aforementioned device will be explained with reference to FIGS. 5 to 9.

(1) An electrode plate K of a predetermined shape is placed on the conveyer 110 along the longitudinal direction with the tip end facing forward (i.e., facing the downstream side). On the other hand, each feed roller unit 240 feeds a single continuous separator S supplied form the separator roller (not illustrated) while pinching it therebetween. At this time, the tip end portion of each separator S is positioned at the upper or lower most portion of the drum section 200 (see FIG. 5A).

(2) When the electrode plate K has reached a predetermined position on the conveyer 110, the sensor camera (electrode plate detector) 130 takes a photograph of the electrode plate K to recognize the position, the posture, etc., and sends a prescribed signal to the controller 50. At this time, each feed roller unit 240 maintains its non-rotating state while fixing the separator S between the feed rollers 241 and 242 in the gap and each of the drums 210 and 220 of the drum section 200 maintains its rotating state while allowing the separator S to slip on the peripheral surface thereof. In other words, each feed roller unit 240 is configured to fix the separator S to allow the separator S to slip on the peripheral surface of the drum 210 and 220 so that the conveying of the separator S is synchronized with the feeding of the electrode plate K. The reason for synchronizing the feeding of the separator S with the conveying of the electrode plate K is to generally align the tip ends of the separators S and the tip end of the separator K in the gap 230 of the drum section 200 (see FIG. 5B).

(3) Upon receipt of the prescribed signal from the sensor camera 130, the controller 50 controls a controlling device (not illustrated) to cause a downward movement of the suction device 120 to suck the electrode plate K. On the other hand, each feed roller unit 240 consecutively feeds the single continuous separator S supplied form a separator roller (not illustrated) while pinching the separator S between the feed rollers 241 and 242. Thus, each separator S adhering to the corresponding drum 210 or 220 is fed in accordance with the rotation of the drum (see FIG. 5C).

(4) The suction device 120 goes upward while maintaining the generally horizontal posture of the electrode plate K and then moves toward the drum section 200 (i.e., in the right direction in FIG. 1) to thereby convey the electrode plate K from the conveyer 110 to the gap 230 of the drum section 200. On the other hand, each feed roller unit 240 consecutively feeds the single continuous separator S while pinching the separator S between the feed rollers 241 and 242. Thus, each separator S adhering to the corresponding drum 210 or 220 is fed to the gap 230 in accordance with the rotation of the drum (see FIGS. 6A to 6C).

(5) When the electrode plate K is conveyed by the suction device 120, the most downstream end pair of rollers of the support portion 140 pinch the tip end portion of the electrode plate K and then the remaining rollers of the support portion 140 move upward to support the electrode plate K in a generally horizontal manner. On the other hand, upon receipt of a command from the controller 50, each of the upper and lower separator cutters 250 moves downward vertically to cut the corresponding separator S into a predetermined shape, for example, as shown in FIG. 3B with a cutting blade provided at the tip end of the cutter (see FIG. 7A).

(6) Upon releasing from the suction head 122 of the suction device 120, the electrode plate K is consecutively fed to the gap 230 of the drums 210 and 220 in accordance with the rotations of the drums 210 and 220. On the other hand, the separators S each cut into a predetermined shape are fed to the gap 230 of the drums 210 and 220 in accordance with the rotations of the drums 210 and 220 (See FIG. 7B).

(7) After joining the pair of separators S and S in the gap 230 of the drums 210 and 220, the separators S and S are stacked on both surfaces of the tip end portion of the electrode plate K. At this time, in the aforementioned step (2), since the feeding of the separator S and the conveyance of the electrode plate K are synchronized with each other by fixing the separator S to allow the separator S to slip on the peripheral surface of the drum, the tip end portion of the separator S and the tip end portion of the electrode plate K generally coincide with each other in the gap 230 of the drum section 200. The upper and lower welders 310 and 320 are moved in the approaching direction to grip the tip ends of both side edge portions of the separators S. At this time, the suction device 120 has been returned to the original position above the conveyer 110 (See FIG. 7C).

(8) The welding section 300 moves forward (i.e., toward the downstream side) in synchronization with the rotation of the drum section 200 while gripping the tip end portions of the separators S to transfer the separators S forward so that the separators S is pulled out forward. At this time, the electrode plate K is transferred forward (i.e., toward the downstream side) in a generally horizontal state by the supporting portion 140 in synchronization with the rotation of the drum section 200. During the transferring step of the electrode plate K, the separators S each adhering to the corresponding peripheral surface of the drum 210 or 220 of the drum section 200 are stacked on both surfaces of the electrode plate K in accordance with the rotation of the drum section 200 (See FIG. 8A).

Figure 8A:
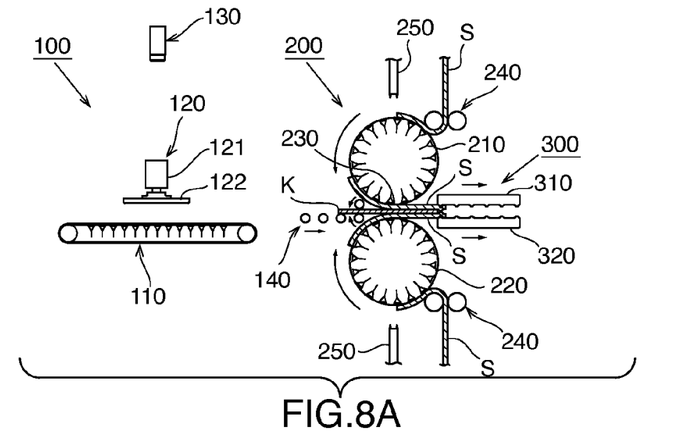
FIGS. 8A to 8C show a fourth step of the electrode plate wrapping method.
Figure 8B:
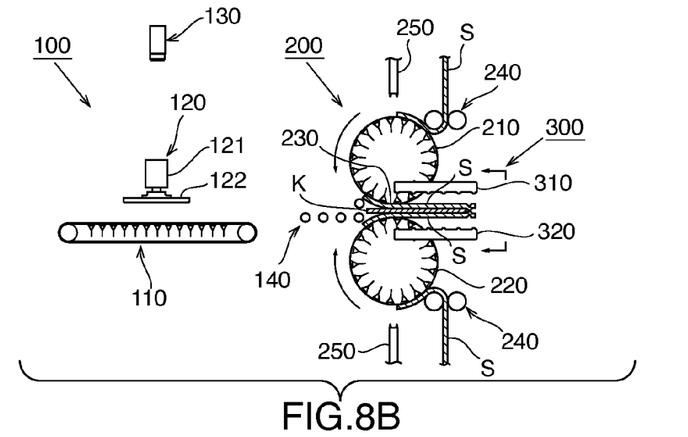

(9) When the separators S stacked on both surfaces of the electrode plate K as a battery cell element D have transferred to a prescribed position, the pair of upper and lower welders 310 and 320 move in a detaching direction to open and then move backward again (see FIG. 8B).

Figure 8C:
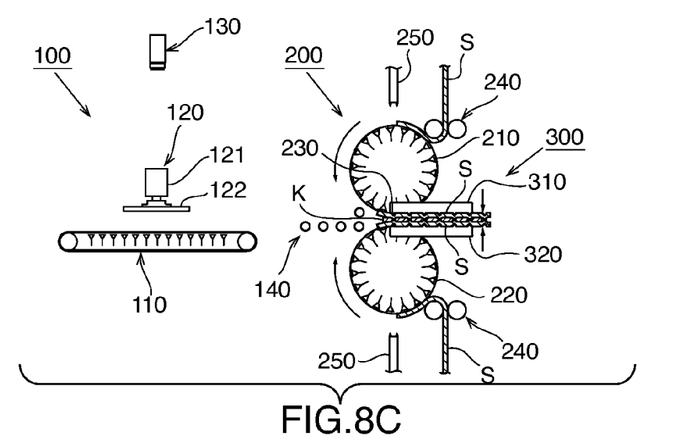

(10) The upper and lower welders 310 and 320 of the welding section 300 move in the approaching direction to grip the separators S by pinching both side edge portions of the separators S to thereby weld the side edge portions with the protrusions 310a and 320a (see FIG. 8C). At this time, as shown in FIG. 3C, both side edge portions of the separators S are spot welded at a plurality of portions "m" as mentioned above, and therefore the electrode plate K will be encapsulated with the separators S.

Figure 9A:
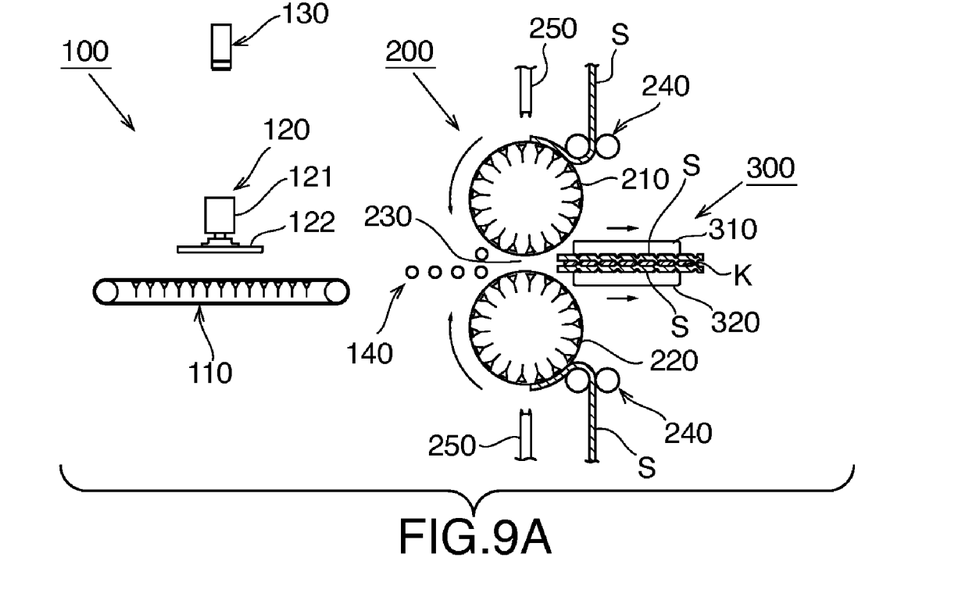
FIGS. 9A and 9B show a fifth step of the electrode plate wrapping method.
Figure 9B:
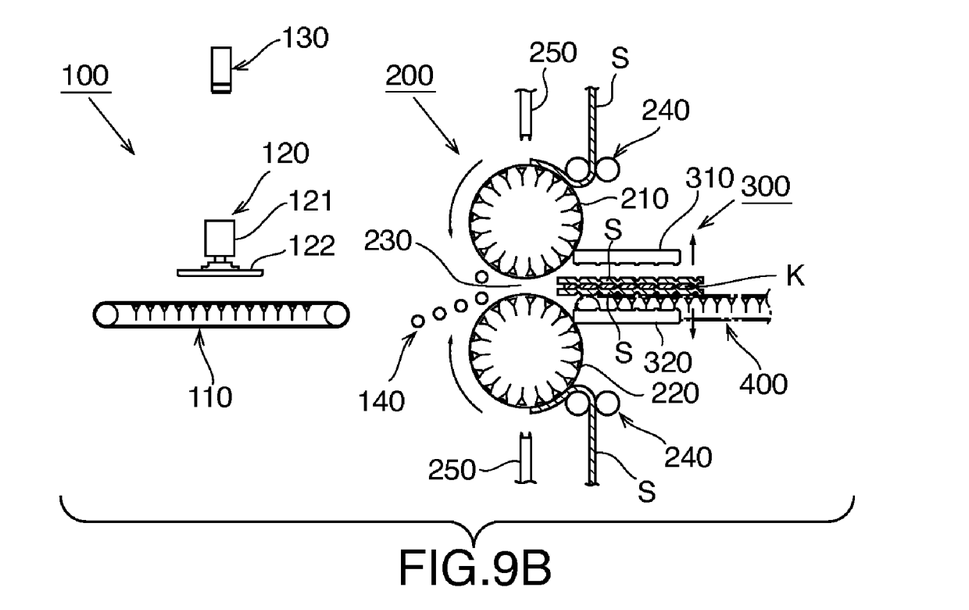

(11) After transferring the electrode plate K to a predetermined position while gripping both side edge portions of the separators S, the welders 310 and 320 of the welding section 300 move in the detaching direction to release the battery cell element D to place the battery cell element D on a second conveyer 400, which in turn conveys the battery cell element D to a predetermined position (see FIGS. 9A and 9B).

At the post-process, the battery cell element D in which a positive or negative electrode plate K is wrapped or encapsulated with separators S, and a counter negative or positive electrode plate K or a counter electrode plate covered with separators are stacked alternately to thereby produce a battery cell.

Second Embodiment

Figure 10B:
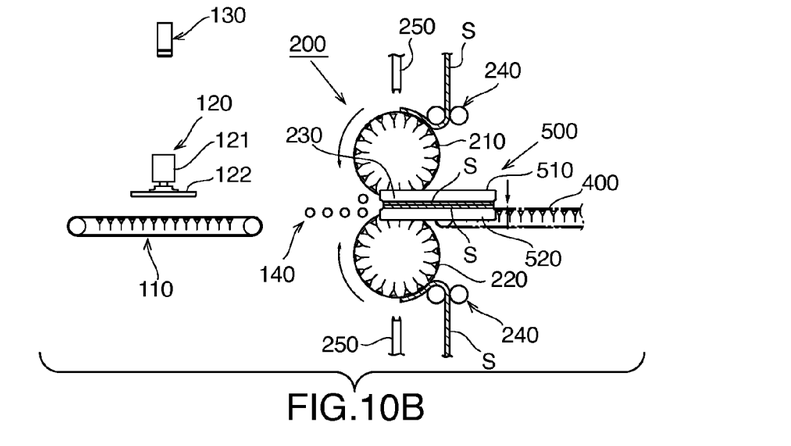
Figure 10C:
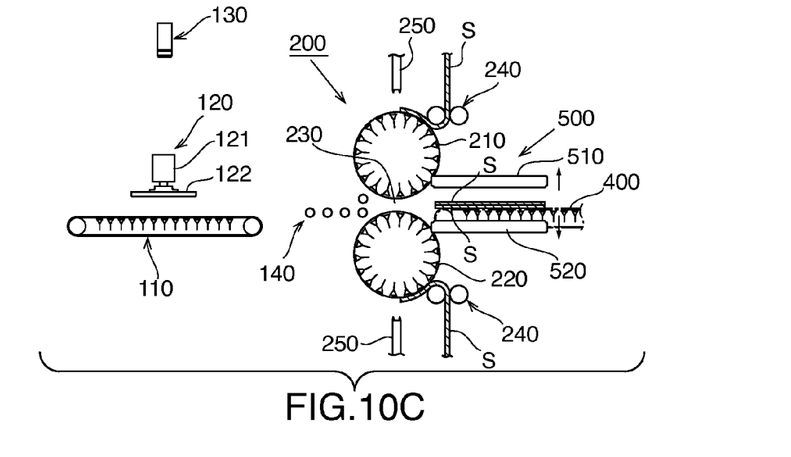

FIGS. 10A to 10C show steps of an electrode plate wrapping method using a device according to a second embodiment of the present invention. In this embodiment, the welding faces of the pair of upper and lower welders 510 and 520 of the welding section 500 are each formed into a flat surface. With this structure, both side edge portions of the separators S can be welded continuously along the longitudinal direction in a strip-shape. In this embodiment, the tip end portions of the separators S are not pulled out like in the first embodiment, and both side edge portions of the separators S are welded in a state in which the almost entire portion of the separators S are exposed from the gap 230 of the drum section 230. In FIGS. 10A to 10C, the same reference number will be allotted to the same device/portions as in the first embodiment to thereby omit the cumulative explanation.

Third Embodiment

Figure 11A:
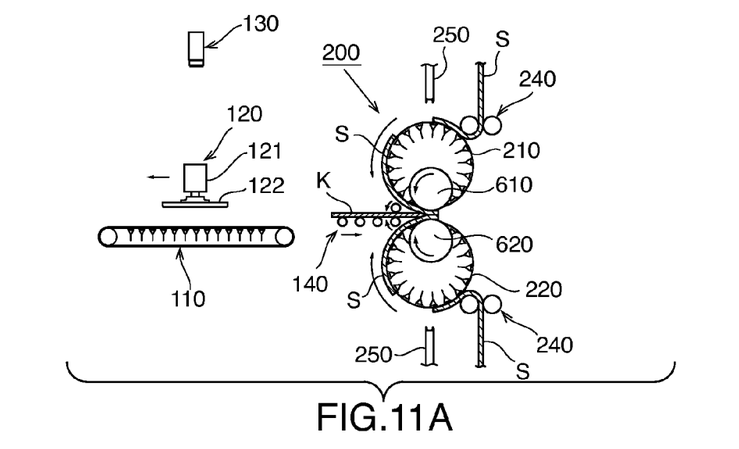
FIGS. 11A to 11C show an electrode plate wrapping method according to a third embodiment of the present invention.
Figure 11B:
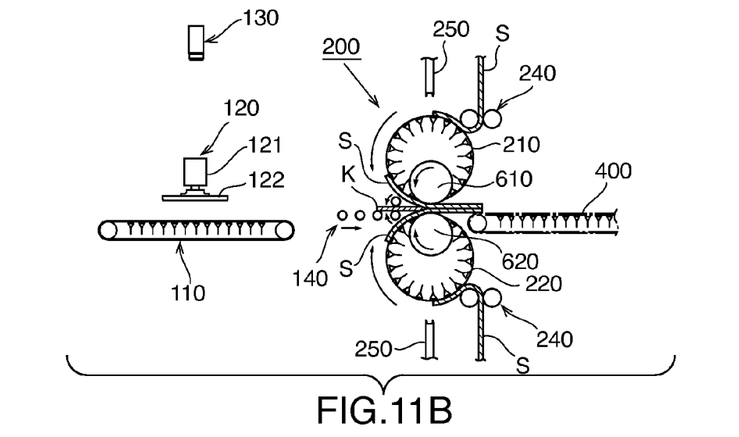
Figure 11C:
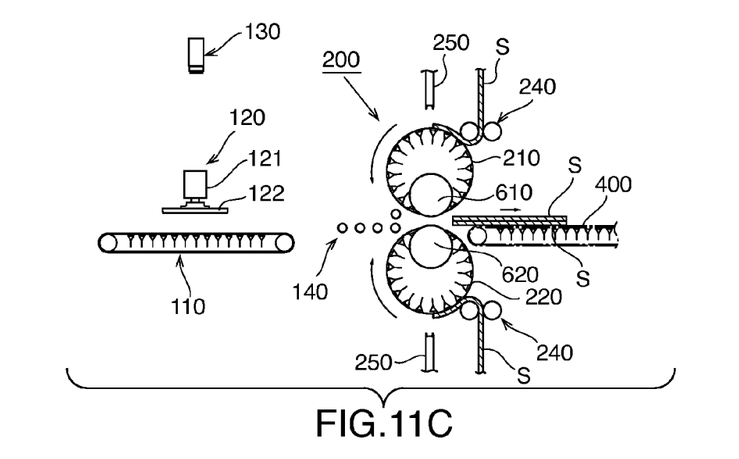

FIGS. 11A to 11C show steps of an electrode plate wrapping method using a device according to a third embodiment of the present invention. In this embodiment, the welding section is comprised of a pair of upper and lower rotating heat rollers 610 and 620 while pinching the separators S therebetween in the up-and-down direction. The heat rollers 610 and 620 rotate in synchronization with the rotations of the drums 210 and 220 of the drum section 200 to weld both side edge portions of the separators S consecutively. In FIGS. 11A to 11C, the same reference number will be allotted to the same device/portions as in the first embodiment to thereby omit the cumulative explanation.

Although the pair of upper and lower drums 210 and 220 of the drum section 200 are arranged with a prescribed gap therebetween in the aforementioned embodiments, the pair of drums 210 and 220 can be arranged such that no gap is provided therebetween. Furthermore, the drum section 200 can be of a suspension type in which one or both of the drums 210 and 220 move in accordance with a thickness of the electrode plate K.

Although the electrode plate K is conveyed in a generally horizontal manner with the conveying section 100 in the aforementioned embodiments, the electrode plate can be conveyed in any posture.

Although the pair of drums 210 and 220 of the drum section 200 are arranged in the up-and-down direction in the aforementioned embodiments, the pair of drums can be arranged in any direction. In this case, the electrode plate K will be transferred in the tangential direction of the facing portions of the drums (i.e., in a direction perpendicular to a linear line passing through the centers of the upper and lower drums 210 and 220). For example, in cases where drums are arranged right and left (i.e., side by side), the electrode plate K will be vertically transferred upward or downward.

Although the welders 310 and 320 of the welding section 300 are arranged up and down in the aforementioned embodiments, the welders can be arranged in any direction. For example, in cases where drums are arranged right and left so that an electrode plate K is transferred vertically from above or below, the welders 310 and 320 are preferably arranged right and left.

Furthermore, the welding section 300 is configured to weld the entire both side edge portions of the separators S in the aforementioned embodiment. However, it can be configured such that both side edge portions of the separators S are partially welded.

In the first and second embodiments, after pulling out the separators S by gripping the tip end portions of the separators S, the welding section 300 completes welding of the entire both side edge portions of the separators S with a single operation. However, the welding operation can be repeated several times. For example, after pulling out separators S by gripping the tip end portions of the separators S, the welding section 300 performs first spot welding only at a part of both side edge portions of the separators (e.g., two points near the tip end portion) and then separators S are pulled out in this state. Then, the welding section 300 returns backward quickly, and performs second spot welding at the subsequent portion of both side edge portions of the separators S (e.g., the next two points) and pulls out the separators S in this state. Then, the welding section 300 again returns backward quickly and performs third spot welding of the subsequent portion of both side edge portions of the separators S (e.g., the next two points) and pulls out the separators S in this state. As explained above, by repeatedly welding both side edge portions of the separators S with the welding section 300, both the side edge portions of the separators S can be welded with a high degree of accuracy.

Furthermore, a single continuous separator S is cut into a predetermined shape with the separator cutter 250 in a state in which the separator S is adhered to the peripheral surface of the drum of the drum section 200 in the aforementioned embodiment. However, a separator previously cut into a predetermined shape can be fed with the separator adhering to the peripheral surface of a drum.

The support portion 140 is constituted only by rollers in the aforementioned embodiments. However, the support portion can be constituted by any other member, such as e.g., a flat member. It is preferable that the most downstream end portion of the support portion 140 is a roller structure which feeds the electrode plate K while pinching it in order to accurately feed the electrode plate K to the gap 230 of the drum section 200.

In the aforementioned embodiments, both side edge portions of the electrode plate K are welded. However, the present invention allows to weld only one of side edge portions, only the tip end portion, three edge portions including both side edge portions and the tip edge portion, or the entire periphery of the electrode plate K.

Furthermore, as shown in FIG. 3, the electrode plate K is conveyed in a longitudinally arranged manner. However, the electrode plate K can be conveyed in a laterally arranged manner (i.e., in a manner such that the electrode plate K is rotated by 90 degrees clockwise or counterclockwise in FIG. 3) or in a manner arranged in any directions.

It also should be noted that the present invention is not limited to one of the aforementioned embodiments, and allows various design modifications. The present invention allows any modifications so long as separators S of a predetermined shape are stacked on both surfaces of an electrode plate K of a predetermined shape while utilizing rotation of the drum section 200.

This application claims priority to Japanese Patent Application No. P2010-262748 filed on Nov. 25, 2010, the entire disclosure of which is incorporated herein by reference in its entirety.

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

While illustrative embodiments of the invention have been described herein, the present invention is not limited to the various preferred embodiments described herein, but includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to." In this disclosure and during the prosecution of this application, means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure and during the prosecution of this case, the following abbreviated terminology may be employed: "e.g." which means "for example;" and "NB" which means "note well."

What is claimed is:

1. A method of wrapping an electrode plate with separators, the method comprising the steps of:
   cutting a pair of separators into a pair of cut separators;
   providing a pair of drums in parallel so as to face with each other;
   conveying an electrode plate to the pair of drums while feeding the pair of cut separators in synchronization with conveyance of the electrode plate such that each of the pair of cut separators is adhered to a corresponding peripheral surface of one of the pair of drums;
   stacking the pair of cut separators on corresponding surfaces of the electrode plate in synchronization with rotations of the pair of drums; and
   welding edge portions of the pair of cut separators in synchronization with rotations of the pair of drums.

2. The method as recited in claim 1, wherein the step of welding the edge portions of the pair of cut separators is repeatedly performed during the step of stacking the pair of cut separators on corresponding surfaces of the electrode plate.

3. The method as recited in claim 1, wherein the step of stacking the pair of cut separators on corresponding surfaces of the electrode plate and the step of welding the edge portions of the pair of cut separators are performed simultaneously or substantially simultaneously.

4. The method as recited in claim 3, wherein the step of welding the edge portions of the pair of cut separators is performed using a pair of heat-rollers arranged in a vicinity of the pair of drums.

* * * * *